April 17, 1962
W. K. PRIESE
3,030,068
BALL VALVE
Filed Nov. 10, 1959
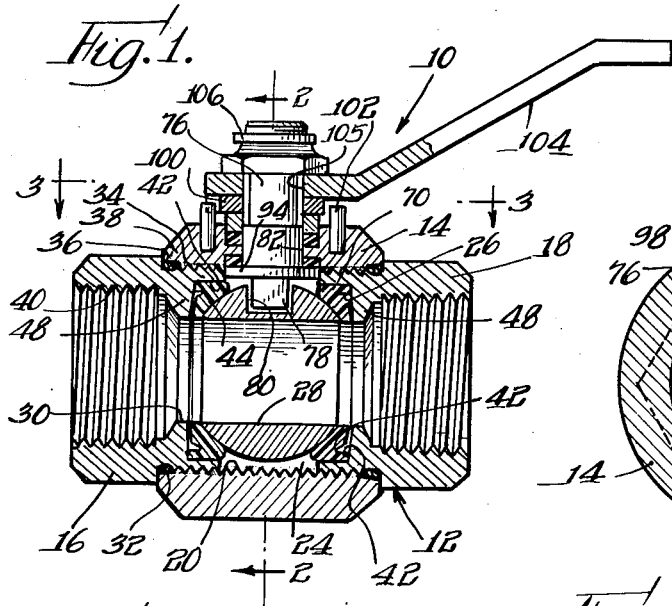
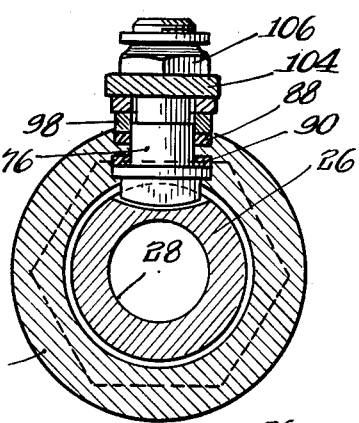
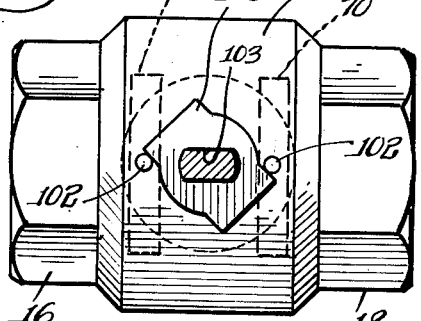
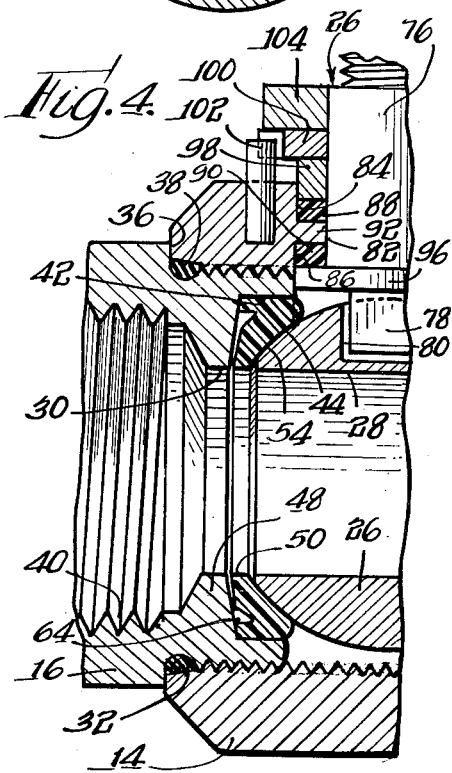
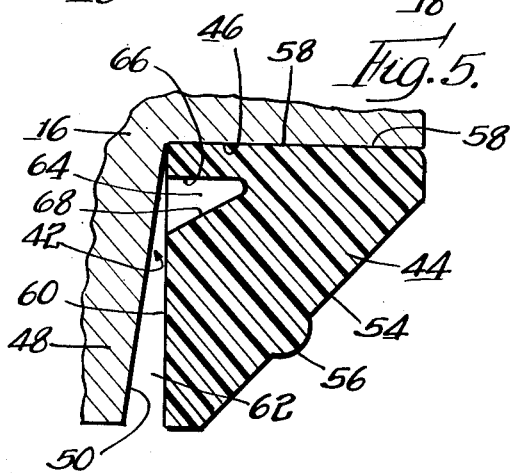
INVENTOR.
Werner K. Priese
BY:
Olson & Trexler
attys.

ns1 Claim - Patent text

United States Patent Office 3,030,068
Patented Apr. 17, 1962

3,030,068
BALL VALVE
Werner K. Priese, Barrington, Ill., assignor to Hills-McCanna Company, Chicago, Ill., a corporation of Illinois
Filed Nov. 10, 1959, Ser. No. 852,144
8 Claims. (Cl. 251—214)

The present invention relates to ball valves through which the flow of fluid is controlled by the rotary position of a valve ball.

One object of the invention is to provide a ball valve having a new and improved construction which sharply reduces the manufacturing cost of the valve while at the same time providing a very sturdy valve marked by a surprisingly high efficiency in use.

Another object is to provide an improved ball valve in which highly simplified valve structure provides in a unique manner for a most efficient seating of the valve ball against coacting valve seats formed of a highly advantageous valve seat material which is, nevertheless, subject to cold flow.

A further object is to provide an improved ball valve of highly simplified and inherently economical construction which makes a most advantageous use of a yieldable valve seat material in providing efficient valve seats which compensate automatically for minor irregularities in the surface of the coacting ball to provide an efficient and reliable sealing of the seats against the ball over a remarkably long service life for a valve of such relatively inexpensive construction.

Another object is to provide an improved valve as recited in the preceding objects which is capable of maintaining a reasonably efficient sealing of valve seats, subject to cold flow, against a coacting valve ball even after the valve seats have been subjected to a rather extensive usage tending to produce deformation of the valve seats.

Another object is to provide an improved and highly simplified ball valve as recited in the preceding objects in which exceptionally simple structure provides a most efficient sealing of the valve against the escape of fluid to the external environment.

Other objects and advantages will appear from the following description of the exemplary form of the invention illustrated in the drawings, in which:

FIG. 1 is a longitudinal sectional view of a ball valve forming the exemplary embodiment of the invention illustrated;

FIG. 2 is a transverse sectional view of the valve taken along the line 2—2 of FIG. 1;

FIG. 3 is a horizontal sectional view taken along the line 3—3 of FIG. 1;

FIG. 4 is a fragmentary sectional view on an enlarged scale corresponding to the generally left hand half section of FIG. 1; and FIG. 5 is a fragmentary sectional view on a greatly enlarged scale showing one valve seat and its support structure in transverse section.

Having reference to the drawings in greater detail, the improved ball valve 10 forming the exemplary embodiment of the invention comprises a valve body 12, FIG. 1, formed by an assemblage of three components 14, 16 and 18, each of which is inherently well adapted to be economically machined from standard bar stock.

Thus the valve body 12 comprises two multipurpose end elements 16, 18 of identical construction turned end for end relative to each other and threaded into opposite ends of a central longitudinal bore 20 in a cylindrical coupling member 14 somewhat larger in diameter than the end elements.

The two end elements 16, 18 together with the coupling member 14 define an internal valve chamber 24 which houses a spherical valve ball 26 defining a central bore 28 which can be turned by rotary movement of the ball into and out of alignment with the longitudinal axis of the housing 12 to open and close the valve as will presently appear.

The coupling member 14 is economically machined from cylindrical bar stock, which is cut to length and longitudinally drilled and internally threaded to form the previously mentioned longitudinal bore 20.

Each of the two identical end elements 16, 18 is economically machined from "hex" bar stock; i.e., bar stock having a shape in transverse section in the form of a regular hexagon; which is cut to length and drilled to form a central longitudinal bore 30. For the sake of simplicity, the ensuing description will apply specifically to the machining of the end element 16 illustrated in FIGS. 1 and 4, it being understood that the end element 18 is identical to the element 16 in construction. The inner end of the element 16 is turned down to a cylindrical form and externally threaded to fit threadedly into the adjacent end of the coupling member bore 20. An annular groove 32 is cut into the element 16 between the external threads 34 which fit into the member 14 and an annular shoulder 36 on the element 16 to receive an annular packing seal 38, which is compressed against the adjacent encircling end of the coupling member 14 upon subsequent assembly of the valve.

The outer end of the element 16 is counterbored along a major portion of the length of the element and internally threaded to form pipe threads 40 adapted to connect with the external threads on a coacting pipe or conduit (not shown).

The inner end of the end element 16 is back counterbored to form an annular valve seat cavity 42, FIG. 4, which is internally shaped in a unique manner in accordance with the invention to receive a uniquely shaped, yieldable valve seat element 44 to provide an improved and highly efficient coaction of the valve seat with the opposing external surface of the valve ball 26.

As shown on an enlarged scale in FIG. 5, the valve seat cavity designated generally by the number 42 is circumferentially bounded by an internal cylindrical surface 46 on the inner end of the element 16. The diameter of the cylindrical surface 46 substantially exceeds the diameter of the central bore 30 in the element 16, thus providing at the bottom of the cavity 42 an annular seat support lip 48 which projects a substantial distance radially inward from the cylindrical surface 46 as shown.

The radial side of the support lip 48 adjacent the cavity 42 is shaped by the back counterboring operation previously mentioned to define an annular valve seat support or bottom surface 50 which has the shape of a truncated cone having an apex angle of one hundred sixty to one hundred seventy degrees that is pointed radially outward from the ball along the axis of the bore 30. The significance of this particular shaping of the valve seat support surface 50 will appear presently.

It will be noted that the reference numbers applied to component elements of the end element 16 are also applied to the corresponding component elements of the end element 18.

The annular cavity 42 in the end element 16, for example, receives the previously mentioned annular valve seat 44 which is preferably formed of polytetrafluoroethylene, a material well suited in many respects for use in the formation of a valve seat. A commercial form of this material is sold under the trade mark, "Teflon," and will be subsequently referred to by this trade mark.

Even though well suited in many respects for use in the formation of a valve seat Teflon, nevertheless, is subject to "cold flow" under pressure. This characteristic of Teflon complicates the problem of maintaining an effective fluid type sealing engagement of Teflon valve seats with coacting valve balls.

However, the seat 44 is shaped into a form which is related to the form of the seat receiving cavity 42 in a manner which makes for an effective sealing of the valve seat against the valve ball 26 over a remarkably long service life.

Thus, as shown in FIGS. 4 and 5, the annular seat 44 is shaped to have substantial axial length and substantial radial depth. For example, a valve seat designed to encircle a connecting bore 30 having a diameter of thirteen-sixteenths of an inch can have an axial length of approximately one-fourth of an inch and an overall radial thickness of substantially three-sixteenths of an inch.

The annular portion of the seat 44 immediately opposing the ball 28 is shaped to define a ball opposing surface 54, FIG. 4. When the seat 44 is in its unstressed condition, the surface 54 has the form of a truncated cone adapted to tangentially engage the opposing spherical surface of the ball 26. Initial contact of the seat 44 with the ball 26 is made by an annular bead 56 rising from a medial circular portion of the surface 54 toward the center of the ball 26 as shown in FIG. 5. This bead is compressed upon assembly of the valve to assure a good sealing contact of the seat with the ball when the valve is initially assembled.

The outer periphery of the seat 44 is bounded by a circumferential surface 58, FIG. 5, of cylindrical form having a diameter equal to that of the seat cavity surface 46.

The end of the valve seat 44 opposite from the ball 28 defines an annular end surface 60 opposing the cavity bottom surface 50 as shown in FIG. 5 and having a substantially coplanar shape before pressure is applied to the seat by the valve ball upon assembly of the valve. Hence, upon initial assembly of the valve seat 44 in the cavity 42, the valve seat surface 60 engages the opposing bottom surface 50 only along the outer marginal edge of the latter.

The previously described conical shape of the bottom surface 50 together with the initially flat shape of the seat surface 60 provides between the bottom surface 50 and the valve seat 46 an annular space 62 which widens progressively in transverse section toward the inner periphery of the valve seat.

This annular space 62 provides for yielding or movement of the ball engaging portion of the seat 44 in an axial direction toward the cavity bottom surface 50.

Optimum yielding or movement of the valve seat 44 toward the seat surface 50 when the seat is engaged by the ball 26 is provided by undercutting the inwardly extending portion of the Teflon valve seat 44 by an annular groove 64 extending axially into the body of the seat from the side of the seat defining the previously mentioned surface 60. Preferably, the groove or annular notch 64 extends into the body of the valve seat 44 for an axial depth equal to approximately one-third of the axial length of the seat. The groove 64 is bounded by a cylindrical surface 66 coaxial with the seat and by a truncated conical surface 68 approaching the surface 66 at an angle of approximately thirty degrees, the juncture of the two surfaces 66 and 68 being somewhat rounded as shown.

A Teflon valve seat 70 identical to the valve seat 44 is similarly mounted in the valve seat cavity 42 in the other end element 18.

The limited annular space 62 provided between the seat 44 and the cavity bottom surface 50 together with the limited annular space in the V-shaped relief 64 allows the ball engaging portion of the seat 44 to yield in a generally radial direction away from the center of the ball 26 to conform to any irregularities in the surface of the ball as the seat and ball are mutually engaged upon assembly of the valve. Yet this same annular clearance which allows yielding of the seat 44 to conform to the valve surface is not sufficient to permit a distortion of the seat to the extent that the effectiveness of its engagement with the valve surface is destroyed, yielding and "cold flow" of the seat being limited where necessary by progressive closing of the space 62 between the valve seat and the supporting surface 50.

The flow control ball 26 is rotated between its open valve and closed valve positions in contact with the opposing seats 44, 70 by means of a radial valve operating stem 76 extending radially through the coupling member 14 into engagement with the valve ball as shown in FIGS. 1, 2 and 4. The inner end of the stem 76 defines a flatted tang 78 which fits into a slot 80 in the ball 26 to form a non-rotatable driving connection between the stem and ball.

The stem 76 extends outward from the ball 26 through a radial bore 82 in the coupling member 14 which is counterbored from its outer end and back counterbored from its inner end to define an outer counterbore 84 and an inner counterbore 86, FIG. 4, which receive inner and outer annular Teflon seals 88 and 90 located on opposite sides of an intervening annular lip 92 on the coupling member.

The inner seal 90 is engaged and compressed against the lip 92 by an annular shoulder 96 on the inner end of the stem 76. The outer face of the outer seal 88 is engaged by an annular gland 98 slidably encircling the stem 76 as it protrudes outwardly from the coupling member 14.

Rotation of the stem 76 is limited to an approximately ninety degree angle by a double ended throw plate 100 non-rotatably yet slidably mounted on the stem 76 in engagement with the gland 98 as shown in FIGS. 1, 3 and 4. Opposite ends of the throw plate 100 project radially outward into interfering relation with two radial stop pins 102 fixed in the coupling member 14 and coacting with the throw plate to terminate movement of the stem 76 in either of two positions corresponding to the open and closed position of the valve ball.

One end of a valve operating handle or lever 104 is slidably fitted non-rotatably over the projecting end of the stem 76 into engagement with the throw plate 100. The portion of the stem 76 which extends through the throw plate 100 and the handle 104 is flatted on opposite sides and fits in elongated apertures 103 and 105 in the throw plate and handle. A nut 106 threaded onto the free end of the stem 76 applies pressure through the handle 104, throw plate 100, and gland 98 to the outer stem seal 88 while at the same time providing traction through the stem 76 to compress the inner seal 90 to insure an effective sealing of the stem against the escape of fluid from the internal valve chamber or cavity 24. Hence, tightening of the single external nut 106 effects simultaneous tightening of both the inner and outer operating stem seals 90 and 88.

The component elements of the valve actuating structure are inherently suited for economical fabrication. The stem 76 is adapted for manufacture by an automatic screw machine. The throw plate 100 can be simply punched out of flat stock, pierced, and broached. The handled 104 is blanked and formed to shape in a simple straightforward manner.

Machining of the coupling 14 and end elements 16 and 18 from bar stock is accomplished simply and inexpensively.

Assembly of the various components to form a completed valve is a very simple matter. Threading of the end elements 16, 18 into opposite ends of the coupling bore 20 is terminated by engagement of the annular shoulders 36 on the end elements with opposite ends of the coupling member.

Even though the manufacturing cost of the valve thus formed is exceptionally low, the valve has the inherent capability of operating efficiently and dependably over an extended service life.

The invention is claimed as follows:

1. A ball valve comprising, in combination, a cylindrical coupling member defining a bore extending longitudinally therethrough, a valve ball rotatably disposed in an intermediate portion of said bore, said coupling member defining an operating stem bore extending radially outward from said longitudinal bore in alignment with said ball, a valve stem drivingly connected to said ball and extending outwardly through said radial bore, said coupling member defining inner and outer counterbores in the inner and outer ends of said radial bore, inner and outer annular seals disposed in said inner and outer counterbores, the inner end of said stem defining an annular shoulder engaging said inner seal to compress the latter against the bottom of said inner counterbore, an annular gland encircling said stem and engaging said outer seal, a throw plate non-rotatably fitted on the projecting end of said stem in engagement with said gland, a handle non-rotatably fitted on the projecting end of said stem in engagement with said throw plate, a retaining nut on the projecting end of said stem engaging said handle to effect simultaneous tightening of both said seals, stop means on said coupling member coacting with said throw plate to positively limit rotary movement of said stem to a predetermined angle, two longitudinally bored connecting elements threaded into opposite ends of said coupling member, each of said connecting elements having a threaded outer end adapted for connection to a coacting conduit, each connecting element being counterbored from the inner end thereof to form an annular valve seat cavity having a cylindrical wall surface of substantial axial length and having a bottom surface in the form of a truncated cone having an outwardly pointing apex angle of the order of one hundred seventy degrees, each valve seat being constituted by a massive annular body of yieldable polymeric material having a generally triangular form in transverse section and defining a cylindrical peripheral surface extending substantially the full axial length of the seat in circumferential engagement with the cylindrical wall surface of the coacting valve seat cavity, each valve seat body defining at the axial end thereof more remote from said ball a radially extending annular end surface which is substantially coplanar when the seat is in its relaxed condition, each seat defining a ball sealing surface of truncated conical shape firmly engaging said ball, and each seat defining an annular notch extending into the body thereof from said annular end surface thereon.

2. A ball valve comprising, in combination, housing means defining an internal valve chamber, a flow control ball rotatably disposed in said chamber, means for rotating said ball between valve open and valve closed positions thereof, two annular valve seats disposed in sealing engagement with said ball at opposite sides thereof, each valve seat being constituted by a massive annular body of yieldable polymeric material having a generally triangular form in transverse section, each valve seat defining two outer surfaces disposed at a substantial angle to each other, a first one of said outer surfaces on each seat extending axially along substantially the entire axial extent of the seat and a second one of said outer surfaces on each seat extending radially along substantially the full radial extent of the seat, each of said seats defining a ball sealing surface confronting said ball and having as viewed in transverse section an oblique relationship to each of said outer surfaces of the seat, each of said seats being supported by rigid support structure circumferentially engaging one of said outer surfaces of the seat along the full width of said one surface, the support structure for each seat defining a rigid annular support surface confronting the other outer surface of the seat along the full width of said other outer surface and having a limited spacing from said other outer surface which extends substantially across the full width of the latter to provide for limited deflection of the seat under load while at the same time serving to limit deflection of the seat by progressive engagement with said other outer seat surface, and each seat defining an annular notch extending thereinto from said other outer surface in adjacent, spaced relation to said last mentioned one outer surface on the seat.

3. A ball valve comprising, in combination, housing means defining an internal valve chamber, a flow control ball rotatably disposed in said chamber, means for rotating said ball between valve open and valve closed positions thereof, two annular valve seats disposed in sealing engagement with said ball at opposite sides thereof, each valve seat being constituted by a massive annular body of a yieldable polymeric material having a generally triangular form in transverse section, each valve seat body defining two outer surfaces disposed at a substantial angle to each other, a first one of said outer surfaces on each seat extending axially along substantially the entire axial extent of the seat and a second one of said outer surfaces on each seat extending radially along substantially the full radial extent of the seat, each of said seats defining a ball sealing surface confronting said ball and having as viewed in transverse section an oblique relationship to each of said outer surfaces of the seat, each of said seats being supported by rigid support structure circumferentially engaging one of said outer surfaces of the seat along the full width of said one surface, and the support structure for each seat defining a rigid annular support surface confronting the other outer surface of the seat along the full width of said other outer surface and having a limited spacing from said other outer surface which extends substantially across the full width of the latter to provide for limited deflection of the seat under load while at the same time serving to limit deflection of the seat by progressive engagement with said other outer seat surface.

4. A ball valve comprising, in combination, a valve housing defining an internal valve chamber, a flow control ball rotatably disposed in said chamber, a pair of annular valve seats disposed on opposite sides of said ball, each of said valve seats being constituted by a massive annular body of a yieldable polymeric material having a generally triangular form in transverse section, each valve seat defining a generally cylindrical outer peripheral surface extending substantially the full axial length of the valve seat, each valve seat defining on the axial end thereof more remote from the valve ball an end surface extending radially from said cylindrical surface on the seat to the inner periphery of the seat and having a generally coplanar form when the seat is in its relaxed condition: each valve seat defining a ball sealing surface of generally conical shape and having, as viewed in a transverse section of the valve seat, an oblique relationship to said cylindrical peripheral surface and said annular end surface of the valve seat; and each of said seats being supported in sealing engagement with said ball by a rigid support structure defining a cylindrical support surface circumferentially engaging the cylindrical peripheral surface on the seat along the full axial length of the cylindrical seat support surface, said support structure for each valve seat defining an annular support surface extending radially inward from said cylindrical surface on the support structure supporting the seat and progressively diverging from said end surface of the seat in a radially inward direction to define between said annular support surface and the adjacent valve seat a thin clearance extending radially inward from the adjacent cylindrical seat support surface and providing for limited deflection of the adjacent valve seat under load.

5. A ball valve comprising, in combination, a valve housing defining an internal valve chamber, a flow control ball rotatably disposed in said chamber, a pair of annular valve seats disposed on opposite sides of said ball, each of said valve seats being constituted by a massive annular body of yieldable polymeric material having a generally triangular form in transverse section, each valve seat defining an outer peripheral surface extending substantially the full axial length of the valve seat, each valve seat defining on the axial end thereof more remote from the valve ball an end surface extending radially from said outer peripheral surface on the seat to the inner periphery of the seat; each valve seat defining an annular ball sealing surface confronting said ball, each of said seats being supported in sealing engagement with said ball by rigid support structure defining a support surface circumferentially engaging said peripheral surface on the seat along substantially the full width thereof, and said support structure for each valve seat defining an annular support surface confronting said end surface on the seat across substantially the full width of the end surface in spaced relation thereto to define therewith a narrow clearance space extending substantially the full radial width of the seat to allow only limited deflection of the seat under load.

6. A ball valve comprising, in combination, a valve housing defining an internal valve chamber, a flow control ball rotatably disposed in said chamber, a pair of annular valve seats disposed on opposite sides of said ball, each of said valve seats being constituted by a massive annular body of yieldable polymeric material having a generally triangular form in transverse section, each valve seat defining an outer peripheral surface extending substantially the full axial length of the valve seat, each valve seat defining on the axial end thereof more remote from the valve ball an end surface extending radially from said outer peripheral surface on the seat to the inner periphery of the seat; each valve seat defining an annular ball sealing surface confronting said ball and having, as viewed in a transverse section of the valve seat, an oblique relationship to said peripheral surface and said annular end surface of the valve seat; each of said valve seats defining a raised annular bead thereon medially located with respect to the width of said ball sealing surface on the seat, each of said seats being supported in sealing engagement with said ball by a rigid support structure defining a support surface circumferentially engaging said peripheral surface on the seat along substantially the full width thereof, and said support structure for each valve seat defining an annular support surface confronting said end surface on the seat across substantially the full width of the end surface in spaced relation thereto to define therewith a narrow clearance space extending substantially the full radial width of the seat to allow only limited deflection of the seat under load.

7. A ball valve comprising, in combination, a cylindrical coupling member defining a longitudinal bore extending therethrough and having an external over-all form which is cylindrical, a valve ball rotatably disposed in an intermediate portion of said bore, said coupling member defining an operating stem bore extending radially outward from said longitudinal bore in alinement with said ball, a valve stem drivingly connected to said ball and extending outwardly through said radial bore, said coupling member defining inner and outer counterbores in the inner and outer ends of said radial bore, inner and outer seals disposed in said respective counterbores, the inner end of said stem supporting compression means in engagement with said inner seal to apply axial force thereto, a gland disposed on a projecting portion of said stem in engagement with said outer seal, tightening means coacting with said valve stem and said gland means to move the latter in opposite directions with respect to each other to effect simultaneous tightening of both said seals, two longitudinally bored connecting elements threaded into opposite ends of said coupling member, each connecting element defining a valve seat counterbore in the inner end thereof, an annular valve seat disposed in the counterbore in each connecting element and being constituted by a massive annular body of yieldable polymeric material having a generally triangular form in transverse section, each valve seat defining an outer peripheral surface extending substantially the full length of the valve seat and being circumferentially engaged along its full width by the adjacent structure of the connecting element defining the counterbore receiving the valve seat, each valve seat defining on the axial end thereof more remote from the valve ball an end surface extending radially over substantially the full radial extent of the seat, each end element defining at the bottom of the counterbore therein an annular surface confronting said end surface on the adjacent valve seat across substantially the full width of the seat end surface and having a spacing from the adjacent valve seat end surface which extends substantially across the full width of the end surface and which progressively increases in width in a radially inward direction, and each valve seat defining an annular ball sealing surface confronting said ball in sealing engagement therewith.

8. A ball valve comprising, in combination, a central member defining a central bore therein, a valve ball rotatably disposed in said bore, said member defining a radial bore extending outwardly from said central bore in alinement with said ball, a valve stem drivingly connected to said ball and extending outwardly through said radial bore, said member defining inner and outer counterbores in the inner and outer ends of said radial bore, inner and outer seals disposed in said respective counterbores, the inner end of said stem supporting compression means in engagement with said inner seal to apply axial force thereto, a gland encircling said stem in engagement with said outer seal, tightening means coacting with said valve stem and said gland means to move the latter in opposite directions with respect to each other to effect simultaneous tightening of both said seals, means on said central member defining connecting passages into opposite ends of said central bore, two annular valve seats confronting said ball in encircling relation to said respective connecting passages, each valve seat being constituted by a massive annular body of a yieldable polymeric material having a generally triangular form in transverse section, each valve seat body defining two outer annular surfaces disposed at a substantial angle to each other, a first one of said outer surfaces on each seat extending along substantially the entire axial extent of the seat and a second one of said outer surfaces on each seat extending along substantially the full radial extent of the seat, each of said seats defining a ball sealing surface confronting said ball and having as viewed in transverse section an oblique relationship to each of said outer surfaces of the seat, support means for each valve seat circumferentially engaging one of said outer surfaces of the seat along substantially the full width of said one surface, and said support means for each valve seat defining a surface confronting the other outer surface of the coacting seat along substantially the full width of said other outer surface and having a limited spacing from said other outer surface which extends substantially across the full width of the latter to provide for limited deflection of the seat under load while at the same time serving to limit the deflection of the seat by progressive engagement with said other outer surface.

References Cited in the file of this patent

UNITED STATES PATENTS

| 2,858,098 | Sanctuary | Oct. 28, 1958 |
| 2,861,773 | Clade | Nov. 25, 1958 |
| 2,890,856 | Clade | June 16, 1959 |

FOREIGN PATENTS

| 484,373 | Canada | June 24, 1952 |
| 684,621 | Great Britain | Dec. 24, 1952 |